(12) United States Patent
Ciardelli et al.

(10) Patent No.: US 7,544,743 B2
(45) Date of Patent: Jun. 9, 2009

(54) PROCESS OF CONTROLLED RADICAL GRAFTING OF A POLYOLEFIN

(75) Inventors: Francesco Ciardelli, Pisa (IT); Elisa Passaglia, Pisa (IT); Serena Coiai, Pontasserchio (IT)

(73) Assignee: Universita' Di Pisa, Pisa (IT)

( * ) Notice: Subject to any disclaimer, the term of this patent is extended or adjusted under 35 U.S.C. 154(b) by 525 days.

(21) Appl. No.: 10/562,426

(22) PCT Filed: Jun. 24, 2004

(86) PCT No.: PCT/IB2004/002098
§ 371 (c)(1),
(2), (4) Date: Dec. 27, 2005

(87) PCT Pub. No.: WO2004/113399
PCT Pub. Date: Dec. 29, 2004

(65) Prior Publication Data
US 2006/0148993 A1   Jul. 6, 2006

(30) Foreign Application Priority Data
Jun. 25, 2003   (IT) ............................... TO03A0478

(51) Int. Cl.
*C08F 8/00* (2006.01)
*C08F 8/30* (2006.01)

(52) U.S. Cl. ........................ 525/191; 525/192; 525/193; 525/194

(58) Field of Classification Search ................ 525/240, 525/285, 191–194; 526/270, 271; 528/403; 548/562
See application file for complete search history.

(56) References Cited

U.S. PATENT DOCUMENTS

| 3,301,837 | A |   | 1/1967 | Giuliano et al. |
| 5,001,197 | A | * | 3/1991 | Hendewerk ................. 525/285 |
| 5,712,323 | A | * | 1/1998 | Braga et al. ................... 522/73 |
| 6,506,863 | B2 | * | 1/2003 | Romani et al. .............. 526/270 |

FOREIGN PATENT DOCUMENTS

EP   1 216 999 A   6/2002

OTHER PUBLICATIONS

F. Romani, et al.: "Monitoring the Chemical Crosslinking of Prolylene Polymers Through Rheology", Polymer, Elsevier Science Publishers B.V., GB, vol. 43, No. 4, Feb. 2002, pp. 1115-1131, XP004312430 ISSN: 0032-3861.

B. Wong, et al.: "Melt Rheology of Graft Modified Polypropylene" Polymer, Elsevier Science Publishers B.V., GB, vol. 38, No. 11, May 1997, pp. 2781-2789, XP004061851, ISSN: 0032-3861.

* cited by examiner

*Primary Examiner*—Irina S Zemel
(74) *Attorney, Agent, or Firm*—Sughrue Mion, PLLC

(57) ABSTRACT

The present invention relates to a controlled radical grafting process of a polyolefin derived from monomeric units including α-olefins. This process comprises the reaction of the polyolefin and at least one radical reaction initiator with a grafting system which comprises at least one grafting compound having an electron donor heterocyclic aromatic ring conjugated to at least one —HC=CR$_1$R$_2$ group in which at least one of R$_1$ and R$_2$ is an electron acceptor functional group. The process can be performed continuously in an extruder or discontinuously in a mechanical mixer.

25 Claims, No Drawings

PROCESS OF CONTROLLED RADICAL GRAFTING OF A POLYOLEFIN

This is a National Stage entry of International Application PCT/IB2004/002098, with an International Filing Date of Jun. 24, 2004, which was published as WO 2004/113399 A3, and the complete disclosure of which is incorporated into this application by reference.

BACKGROUND OF THE INVENTION

The invention relates to a controlled grafting process of a polyolefin in the presence of radical reaction initiators.

Radical grafting of polyolefins is a method widely used in the industrial field for the production of modified materials, essential in many plastics formulations and used, for example, as chemical coupling agents, impact modifiers or compatibility enhancers for fillers. The grafting reaction allows the introduction into the polymeric chain of small quantities of polar groups, for example of anhydride or acid ester nature (contained in general in small percentages by weight), with the object of imparting new properties to the polymer without significantly varying its starting characteristics. Usually, the reactive transformation process is conducted in discontinuous mechanical mixers or in extruders, at a temperature which makes it possible to maintain the reaction mixture in the molten state.

The reactive mixture also comprises, beyond the polyolefin, at least one radical reaction initiator and at least one grafting compound. Usually, the initiator is a peroxide, whilst the grafting compound, possibly in mixture with other compounds, is an unsaturated polar compound, such as, for example, maleic anhydride, a maleic ester, a maleic semiester or a methacrylate.

In the reaction mechanism the radical reaction initiator, a peroxide, decomposes into peroxide radicals (RO') at high temperatures. The peroxide radicals can be stabilised with termination reactions, combined with a grafting compound (M) or extract a hydrogen from the polyolefin (P) by generating macroradicals (P.). The macroradicals (P.) of the polyolefin can give cross linking products, degradation products or interact with grafting compounds to give other radicals (PM.). The grafted polyolefins (PMH) are generated when the macroradicals (PM.) of the grafted polyolefin become stable by extracting a hydrogen from another molecule of polyolefin, which in turn becomes radical (P.).

However, because of the great reactivity and consequent low selectivity of the free radicals in their reactive activity, the grafting of the polyolefin occurring in the melt by radical means is accompanied by collateral reactions which can be attributed to the degradation reactions and to cross linking reactions of the polyolefin. When these reactions occur, which compete with the grafting, the process therefore has a reduced overall efficiency and a final product with a low degree of grafting. Another consequence of the degradatory and cross linking reactions is the variation in the average molecular weight of the polyolefins.

In the treatment of polypropylene with peroxides, for example, the phenomenon of rupture of the macromolecular chain through β-splitting reactions is predominant. The macroradical coupling reactions which lead to the formation of cross linked polymers are, in fact, notably slower than β-splitting because of both the ratio between the velocity constants of the two processes, which promotes degradation, and of the biomolecularity of the kinetics of the coupling process. The overall effect of the addition of a peroxide to polypropylene therefore leads to a diminution of the average molecular weight and an increase in the "melt flow rate" (MFR) with strong variations in the primary structure of the polymer.

The association of maleic anhydride (MAH) in the treatment of the polypropylene with peroxides to obtain grafting of the polymer leads to similar results. In fact, a drastic reduction in the molecular weight is evident for any grafting compound/initiator ratio and a dependence of the degree of final grafting on this ratio is evident. It is known, moreover, that the coupling of the MAH takes place principally on the primary radical deriving from the β-splitting reactions.

By working in the melt, therefore, it is rather difficult to obtain a good compromise between the radical grafting reactions and the β-splitting reaction of the polymeric chain. The problem is essentially tied to the formation of unstable tertiary macroradicals which give rise preferentially to β-splitting reactions.

To limit the degradatory effect and, therefore, the β-splitting reactions, radical grafting procedures are known (referred in particular to the grafting of polypropylene) which utilise molecules or systems of molecules to put along-side known grafting compounds and which are able to convert the macroradicals into radicals less subject to β-splitting reactions.

One example is the radical grafting assisted by styrene (STY). In the grafting of polypropylene (PP) with glycidyl methacrolate (GMA), slightly reactive to macroradicals of the polymer, the styrene can be utilised as a grafting co-agent. The styrene reacts in the first place with the macroradicals of polypropylene giving rise to radicals of the more stable styrilic type less subject to the degradation reaction. Subsequently these radicals co-polymerise with GMA. In this way, instead of directly grafting the GMA on the polymeric chain, the STY is inserted as a bridge between the PP and the grafting compound. It is deemed, moreover, that GMA reacts more easily with the styrilic radicals, than with macroradicals of PP: consequently, a synergic effect takes place which further limits the degradation of the polymer.

Similar results are obtained although with different reaction mechanisms by utilising styrene in the radical grafting of polypropylene with maleic anhydride.

The use of the styrene as grafting co-agent is limited, however, by the fact that only some grafting compounds succeed in effectively copolymerising with the styrilic macroradicals with effective inhibition of the degradatory processes. The procedure is only useable, however, to insert some functional groups into the polyolefin chain, limiting the possible applications of the final grafted products.

SUMMARY OF THE INVENTION

The principal object of the process according to the present invention is that of obviating the criticality and limits of the known procedures for radical grafting of polyolefins.

A further object is that of improving the efficiency of the grafting reaction of polyolefin by discouraging the collateral reactions which compete with the main grafting reaction.

This and other objects and advantages are achieved by the radical grafting process of a polyolefin comprising the reaction of the polyolefin and at least one radical reaction initiator with a grafting system which comprises at least one grafting compound having an electron donating heterocyclical aromatic ring conjugated to at least one —HC=$CR_1R_2$ group in which at least one of the $R_1$ and $R_2$ is an electron acceptor functional group.

As already indicated in the known processes, in the case of polypropylene radical peroxides attack on the macromolecules causes the formation of unstable tertiary macroradicals which evolve preferentially through β-splitting reactions. The combination of macroradicals with grafting compounds, such as, for example, maleic anhydride, leads to more unstable radicals. The criticality of the grafting reaction therefore resides in the instability of these intermediate macroradicals which discourage the reactions which lead to the formation of stable polypropylene molecules (grafted) from these macroradicals combined with the grafting compounds.

The process according to the present invention makes it possible to regulate the reactivity of these tertiary macroradicals by increasing their stability and at the same time reducing the tendency to evolve through degradation reactions.

This result is obtained by utilising, as grafting compounds, compounds with a molecular structure comprising an electron donator heterocyclic aromatic ring conjugated to at least one group of formula

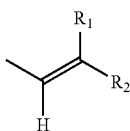

which has a double bond, in which at least one of the two substituent groups $R_1$ and $R_2$ is an electron acceptor functional group.

The electron acceptor group permits attachment on the double bond of the grafting compound by the tertiary macroradicals, whilst the electron donator heterocyclic aromatic ring stabilises by resonance the new macroradical which forms.

The high speed of addition of the macroradicals to the grafting compounds (due principally to the electron acceptor character of the substituent groups on the double bond) and the formation of a radical stabilised by the conjugation with the heterocyclic aromatic ring explains both the hydrogen extraction reactions, which leads to stable molecules of grafted polyolefin, and the occurrence of coupling reactions between radicals, with formation of cross linked/branched polyolefin. Consequently, there is an inhibition of the degradative β-splitting reactions.

In some cases the stable molecules of grafted polyolefin, deriving from the polyolefin/grafting compound macroradicals stabilized by loss of a hydrogen, still have a double bond. These molecules can therefore combine with other grafting compounds thanks to the unsaturation (double bond). In the formulation of the grafting system according to the invention it is therefore possible to associate also grafting compounds used in the processes according to the prior art, such as maleic anhydride, maleic esters, acrylic and methacrylic compounds such as glycidyl methacrylate or azide derivatives. The functionality of these compounds can insert on the polyolefin stabilised by grafting compounds with a heterocyclic aromatic ring.

Thanks to the use of a grafting system comprising grafting compounds with adequate substituent polar groups, to their speed of addition, as well as to their capacity to give life to macroradicals stabilised by resonance, the process according to the present invention therefore makes it possible to contain the degradation of the polyolefin and at the same time to graft on chain functional groups suitable for the subsequent use of the product, for example as a compatibility enhancing agent, chemical coupling agent or impact modifier.

The heterocyclic aromatic ring of grafting compounds utilised in the process according to the invention can be preferably chosen from a furanic, thiophenic or pyrrolic ring, possibly substituted.

The substituent functional groups on the double bond, previously indicated $R_1$ and $R_2$, can advantageously be chosen, on the other hand, between the group consisting of —H, —COOR, —COOH, —COR, —COH, —CN, —CONH$_2$, —COO(CH$_2$)$_n$CF$_3$ and —COO(CH$_2$)$_n$CN, where R is a linear or branched aliphatic or aromatic alkyl group and n is a whole number between 1 and 20 with the proviso that $R_1$ and $R_2$ are not both —H.

Preferred examples of grafting compounds according to the present invention are, for example, the following compounds:

3-carboxyethyl 2-furfuryl acrylate of ethyl (CEFA)

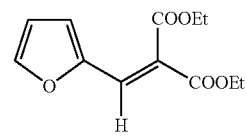

which has a furanic ring as a heterocyclic aromatic ring and —COOR as a substituent group both for $R_1$ and for $R_2$, with R=Et, where Et corresponds to —CH$_2$CH$_3$;

Ciano 2-furfuryl acrylate of ethyl (CFA)

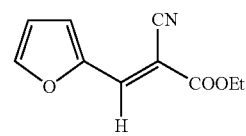

which has a furanic ring as a heterocyclic aromatic ring, the group —CN as a substituent for $R_1$ and the group —COOR as substituent group for $R_2$, with R=Et, where Et corresponds to —CH$_2$CH$_3$; and butylic ester of 3-(2-furanyl)-2-propenoic acid (BFA)

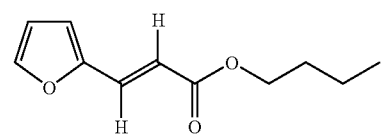

which has a furanic ring as a heterocyclic aromatic ring, $R_1$ is —H and $R_2$ is —COOR, where R corresponds to —CH$_2$CH$_2$CH$_2$CH$_3$.

The process according to the present invention can be performed discontinuously with a single mixer or continuously with a single extruder.

The discontinuous (batch) process can be performed according to the following stages:
- preparation of the mixing/reaction chamber into the process conditions;
- introduction of the polyolefin into the mixer;
- melting and mechanical mixing of the polyolefin;
- introduction of the grafting system into the mixer;
- homogenisation of the mixture of polyolefin/grafting system introduction of the radical reaction initiator into the mixture;

grafting reaction of the polyolefin; and (possible) introduction of a radical reaction inhibitor.

Initially, the reaction chamber of the mixer or extruder, preferably filled with inert gas, for example nitrogen, is brought to the process temperature. Polyolefin is then introduced into the mixture in quantities such as to fill the mixing chamber; during the melting of the polymer, still in an inert gas atmosphere, mechanical mixing takes place which allows homogenisation of the material. The melting and mixing of the polymer can be considered complete when the torque transmitted by the rotor of the mixture is stabilised. The grafting system is added to the polyolefin and process proceeds, still under an inert gas atmosphere, to the homogenisation of the mixture. Once adequate mixing has been reached, which can be evaluated by the variation in time of the torque of the rotor, the radical reaction initiator is introduced. Then, the true and proper radical reactive grafting stage of the polyolefin follows. In order to block the progress of the reaction beyond the established limits it is possible to add to the reagent mixture a radical reaction inhibitor compound such as 3,5-di-tert-butyl-4 hydroxytoluene (BHT), Irganox 1010 or Irganox 1076.

Advantageously the overall residence time of the polyolefin in the mixer lies between 5 and 30 minutes, whilst the process temperature lies between 120 and 230° C. and the mixer rotor has angular velocity between 20 and 70 rpm.

The continuous process can advantageously be performed in a twin screw extruder. Preferably, the polyolefin is introduced into the first section of the extruder whilst the remainder of the reagents are fed into the subsequent section. The average temperature in the reagent introduction section of the extruder must reach at least 210° C. By using, for example, an extruder of diameter D=35 mm and length/diameter ratio L/D=40 advantageously the flow rate can be maintained at 200 kg/h.

The reagent mixture in the process according to the invention preferably has the following composition:

100 parts by weight of a polyolefin chosen from the group of homopolymers of α-olephins and ethylene/α-olefin copolymers;

from 0.05 to 5 parts by weight of a radical reaction initiator or a mixture of initiators;

from 1 to 25 parts by weight of a grafting system; and from 0.05 to 5 parts by weight of a radical reaction inhibitor, to be introduced possibly into the mixture at the end of the process to block the grafting reaction.

Preferably the said radical initiator has a half life of between 10 and 200 seconds in the temperature range lying between 120 and 240° C. The said radical initiator can be an organic peroxide, such as a dialkyl peroxide, a diacyl peroxide, a peroxyester or a peroxyketal and advantageously can be chosen from the group consisting of dicumyl peroxide, ditertbutyl peroxypropylbenzene, 2,5 dimethyl 2,5 ditertbutyl peroxy-hexane, 3,6,9-triethyl-3,6,9-trimethyl-1,4,7-triperoxynonan and their mixtures.

A first advantage which can be achieved with the radical grafting process according to the present invention is that of strictly reducing the alteration of the initial macromolecular structure of the polyolefin. This result can be detected, for example, in the batch process, performed in mechanical mixers, by observing that the final torque of the grafted polyolefin is equivalent to that of the non-grafted polyolefin.

Another advantage lies in a net improvement of the overall efficiency of the grafting reaction which allows final products to be obtained with a better degree of grafting. It is possible to modulate the degree of grafting of the final product by acting on the composition of the feed.

The use of a grafting system with the characteristics according to the present invention makes it possible to control the reactivity of the macroradicals independently of the structure of the polyolefin to be grafted. The process is thus applicable to all types of polymers containing α-olephins.

A further advantage lies in the possibility of inserting into the polyolefin any type of polar functional group such as, for example, ester, amide, cyloxane or ciano groups, obtaining a good degree of grafting. This allows an increase in the possible fields of application of the final products. From this point of view it is also advantageous to have the possibility of performing the process according to the invention through reactive mixing.

The process according to the present invention further allows a high flexibility in the insertion of functional groups into the polyolefin chain. The grafting can in fact derive directly from the functional groups present in the compounds which permit stabilisation of the macroradicals or indirectly from known grafting compounds such as maleic anhydride able to bind to the already stabilised macroradicals.

The grafting compounds chosen for the process according to the invention are easily available and do not require a complex synthesis process. The application of this radical grafting process of the polyolefins is therefore economically advantageous.

Further advantages and characteristics of the present invention will become evident from the following non-limitating examples.

EXAMPLE 1

A discontinuous Brabender Plastograph OH47055 mechanical mixer with a mixing chamber of 30 cm$^3$ provided with two rotors is used. The average temperature was 180° C. with an overall residence time of 25 minutes. Speed of rotation was fixed at 50 rpm.

Having brought the mixing chamber to a temperature of 180° C. in a nitrogen atmosphere, 100 parts by weight (20 g) of polypropylene with MFR (Melt Flow Rate) equal to 0.24 g/10 min was introduced (still maintaining the atmosphere of nitrogen) in such a way as to fill the chamber entirely. Having reached a constant torque, 25 parts by weight of 3-carboyethyl 2-furfuryl acrilate of ethyl (CEFA) were introduced in the liquid state as a grafting system and, after having reached an adequate homogenisation of the mixture, 2 parts by weight of dycumyl peroxide were introduced as radical reaction initiator. At the end of the process 1 part by weight of BHT was introduced as radical reaction inhibitor to inhibit any further radical process.

The torque transmitted by the two rotors at the end of the procedure and the degree of grafting (FD) of the polyolefin after the process are reported. The degree of grafting (% mol) is intended to mean the number of functional groups introduced onto the polyolefin chain each 100 repeating monomeric units.

The variation of the torque, detected through continuous monitoring of the force exerted by the rotors during mixing is utilised to follow the procedure of the reactions in a qualitative manner. This quantity is moreover directly proportional to the viscosity of the molten mass which is influenced by the addition of liquid reagents, by possible variations in molecular weight to which the polymer is subjected and by the progressing over time of the reaction itself. The degradation of the material (decrease in molecular weight) is manifest, therefore, generally through an evident decrease in the torque.

At the end of the process in the mixing chamber only the final product is present and the final value of the torque is, therefore, indicative of the properties of the product.

Reagent Mixture Composition:
100 parts by weight of polypropylene;
25 parts by weight of CEFA;
2 parts by weight of DCP;
1 part by weight of BHT.
Final torque=3.8 Nm;
FD=0.8% mol

EXAMPLE 2

Comparison

With the mixer of example 1 and with the same process conditions the same quantity of polypropylene was mixed, characterised by MFR (Melt Flow Rate) equal to 0.24 g/10 min, for a time of 25 minutes at average temperature of 180° C. and a rotation speed of 50 rpm. No other compound was added to the polypropylene in the mixture. For the final product the final torque was noted.

Final torque=10.9 Nm.

EXAMPLE 3

Comparison

Process was as in example 1 except for the fact that the grafting system was not introduced, only the reaction initiator DCP. For the final product the final torque was noted.

Reagent Mixture Composition:
100 parts by weight of polypropylene;
0.5 parts by weight of DCP;
1 part by weight of PHD.
Final torque=1.4 Nm.

As can be seen by comparing examples 1, 2 and 3, the polypropylene grafted with the process according to the present invention has a final torque less than the propylene treated only thermally (example 2) but greater than that demonstrated by the propylene treated only with DCP (example 3). It is possible to conclude that this is due to the inhibition action against the degredation reactions exercised by the grafting system according to the invention.

EXAMPLE 4

Process was as in example 1, halving, however, the quantity of initiator DCP fed to the mixer. For the final product, the final torque and FD were noted.

Reagent Mixture Composition:
100 parts by weight of polypropylene;
25 parts by weight of CEFA;
1 part by weight of DCP;
1 part by weight of BHT.
Final torque=5.3 Nm;
FD=0.4% mol.

EXAMPLE 5

Process was as in example 1, reducing however, the quantity of grafting compound CEFA fed to the mixer. For the final product the final torque and FD were noted.

Reagent Mixture Composition:
100 parts by weight of polypropylene;
10 parts by weight of CEFA;
2 parts by weight of DCP;
1 part by weight of BHT.
Final torque=3.7 Nm;
FD=0.7% mol.

EXAMPLE 6

Process was as in example 5, halving, however, the quantity of reaction initiator DCP supplied to the mixer. For the final product the final torque and FD were noted.

Reagent Mixture Composition:
100 parts by weight of polypropylene;
10 parts by weight of CEFA;
1 part by weight of DCP;
1 part by weight of BHT.
Final torque=5.3 Nm.
FD=0.4% mol.

EXAMPLE 7

Process was as in example 5, halving, however, the quantity of grafting compound CEFA supplied to the mixer. For the final product the final torque and FD were noted.

Reagent Mixture Composition:
100 parts by weight of polypropylene;
5 parts by weight of CEFA;
2 parts by weight of DCP;
1 part by weight of BHT.
Final torque=3.2 Nm;
FD=0.7% mol.

EXAMPLE 8

Comparison

Process was as in example 7, halving, however, the quantity of reaction initiator DCP supplied to the mixer. For the final product the final torque and FD was noted.

Reagent Mixture Composition:
100 parts by weight of polypropylene;
5 parts by weight of CEFA;
1 part by weight of DCP;
1 part by weight of BHT.
Final torque=3.8 Nm.
FD=0.3% mol.

By comparing examples 1 and 4 to 8, it is observed that the degree of grafting FD can be modulated on the basis of the supplied composition. High percentages of CEFA (grafting system) promote FD. The degree of grafting FD is, however, also influenced by the quantity of initiator: with the same grafting system, FD is directly proportional to the quantity of peroxide supply. It is also to be noted that the final torque is inversely proportional to the supplied quantity of reaction initiator.

EXAMPLE 9

A discontinuous Brabender Plastograph OH47055 mixer was utilised with a mixing chamber of 30 cm$^3$ provided with two rotors. The average temperature was 180° C. with an overall residence time of 25 minutes. The speed of rotation was fixed at 50 rpm.

Having brought the mixing chamber to the temperature of 180° C. in a nitrogen atmosphere, 100 parts by weight (20 g) of polypropylene with MFR (Melt Flow Rate) equal to 0.24 g/10 minutes was introduced (still maintaining the nitrogen atmosphere) in such a way as entirely to fill the chamber. Having reached a constant torque, 20 parts by weight of ciano 2-furfuryl acrylate of ethyl (CFA) were introduced in the solid state as grafting system and, after having reached an adequate homogenisation of the mixture, 2 parts by weight of dicumyl peroxide initiator as radical reaction initiator were introduced. At the end of the process, 1 part by weight of BHT was introduced as radical reaction inhibitor to inhibit any further radical process.

For the final product the final torque and FD were noted.
Reagent Mixture Composition:
100 parts by weight of polypropylene;
20 parts by weight of CFA;
2 parts by weight of DCP;
1 part by weight of BHT.
Final torque=3.6 Nm;
FD=0.51% mol.

EXAMPLE 10

A discontinuous Brabender Plastograph OH47055 mechanical mixer with the mixing chamber of 30 cm$^3$ provided with two rotors was used. The average temperature was 180° C. with an overall residence time of 15 minutes. Speed of rotation was fired at 60 rpm.

Having brought the mixing chamber to a temperature of 180° C. in a nitrogen atmosphere, 100 parts by weight (20 g) of polypropylene with a MFR (Melt Flow Rate) equal to 0.8 g/10 min were introduced (still maintaining the nitrogen atmosphere) in such a way as to entirely fill the chamber. Having reached a constant torque, 10.4 parts by weight of grafting system were introduced of which 10 parts by weight of maleic anhydride (MAH) in the solid state and 0.4 part by weight of butylic ester of 3-(2-furanyl)-2-propenoic acid (BFA) in the liquid state. After having reached adequate homogenisation of the mixture, 0.4 parts by weight of 2,5 dimethyl 2,5 diterbutyl peroxy-hexane were introduced as radical reaction initiator. At the end of the process, 1 part by weight of BHT was added as radical reaction inhibitor to inhibit any further radical process.

For the final product, the final torque was noted and the degree of grafting FD relative to the introduction of the functional groups of MAH, indicated as FD (MAH), and of BFA, indicated as FD (BFA), were noted.
Reagent Mixture Composition:
100 parts by weight of polypropylene;
0.4 parts by weight of BFA;
10 parts by weight of MAH;
0.4 parts by weight of 2,5dimethyl 2,5 diterbutyl peroxy-hexane;
1 part by weight of BHT.
Final torque=4.4 Nm;
FD(MAH)=0.56% Mol;
FD (BFA)=0.10% Mol.

EXAMPLE 11

The procedure was as in Example 10 increasing the quantity of grafting compound BFA. For the final product the final torque, the degrees of grafting FD (MAH) and FD (BFA) were noted.
Reagent Mixture Composition:
100 parts by weight of polypropylene;
1.0 part by weight of BFA
10 parts by weight of MAH;
0.4 parts by weight of 2.5 dimethyl, 2.5 diterbutyl peroxy-hexane;
1 part by weight of BHT.
Final torque=4.4 Nm;
FD (MAH)=0.60 mol;
FD (BFA)=0.36% mol.

EXAMPLE 12

Comparison

The procedure was as in example 10, utilising, however, as grafting system only maleic anhydride (MAH). For the final product the final torque and FDA (MAH) were noted.
Reagent mixture composition:
100 parts by weight of polypropylene;
10 parts by weight of MAH;
0.4 parts by weight of 2.5 dimethyl 2.5 diterbutyl peroxy-hexane;
1 part by weight of BHT.
Final torque=2.9 Nm;
FD (MAH)=0.43% mol.

By comparing examples 10, 11, and 12, it can be observed that the polypropylene grafted with the procedure according to the present invention (examples 10 and 11) has a higher value of final torque than that of the polypropylene grafted according to the prior art only with MAH (Example 12). The addition of BFA in the grafting system is able to reduce the degradation reactions and to determine an increase in the degree of grafting FD of the polyolefin.

EXAMPLE 13

A discontinuous mechanical Brabender Plastograph OH47055 mixer with a mixing chamber of 30 cm$^3$ provided with two rotors was used. The average temperature was 180° C. with an overall residence time of 15 minutes. The speed of rotation was fixed at 60 rpm.

Having brought the mixing chamber to the temperature of 180° C. in a nitrogen atmosphere, 100 parts by weight (20 g) of polypropylene with MFR (Melt Flow Rate)=0.8 g/10 min were introduced (still maintaining the nitrogen atmosphere), in such a way as entirely to fill the chamber. Having reached a constant torque, 3.5 parts by weight of grafting system were introduced, of which 2.7 parts by weight were of maleic anhydride (MAH) in the solid state and 0.8 parts by weight of butylic ester of 3-(2-furanyl)-2-propenoic acid (BFA) in the liquid state. After having reached an adequate homogenisation of the mixture, 0.4 parts by weight of 2,5 dimethyl 2,5 diterbutyl peroxy-hexane were introduced as radical reaction initiator. At the end of the process 1 part by weight of BHT was added as an inhibitor of the radical reactions to inhibit any further radical process.

For the final product the final torque and the degrees of grafting FD (MAH) and FD (BFA) were noted.
Reagent Mixture Composition:
100 parts by weight of polypropylene;
0.8 parts by weight of BFA;
2.7 parts by weight of MAH;
0.4 parts by weight of 2,5 dimethyl 2,5 diterbutyl peroxy-hexane;
1 part by weight of BHT.
Final torque=3.7 Nm;
FD (MAH)=0.23% mol;
FD (BFA)=0.12% mol.

EXAMPLE 14

Comparison

The procedure was as in example 13, however utilising as grafting system only BFA. For the final product the final torque and FD (BFA) were noted.

Reagent Mixture Composition:
100 parts by weight polypropylene
0.8 parts by weight BFA
0.4 parts by weight 2,5 dimethyl 2,5 diterbutyl peroxy-hexane;
1 part by weight of BHT.
Final torque=2.6 Nm;
FD (BFA)=0.16% mol.

EXAMPLE 15

The procedure was as in example 13 increasing the quantity of maleic anhydride (MAH). For the final product the final torque and the degrees of grafting FD (MAH) and FD (BFA) were noted.

Reagent Mixture Composition:
100 parts by weight of polypropylene;
0.8 parts by weight of BFA;
6 parts by weight of MAH;
0.4 parts by weight 2,5 dimethyl 2,5 diterbutyl peroxy-hexane;
1 part by weight of BHT.
Final torque=4.7 Nm;
FD (MAH)=0.45 mol;
FD (BFA)=0.10 mol.

By comparing examples 13, 14 and 15, it can be seen how the association of MAH and BFA (examples 13 and 15) leads to values of the final torque greater than those obtained with the use of BFA (in example 14). It can be concluded that the use of a grafting system comprising MAH and BFA permits a more marked inhibition of the degradation reactions.

EXAMPLE 16

A twin screw extruder with a length/diameter ratio (L/D) =40 and D=35 mm was used, maintaining a flow rate of 200 kg/h. The extruder is divided into 12 sections characterised by different thermal profiles. The extruder is equipped with a degassing valve in section 10. In the first section an average temperature of 90° C. was maintained; from section 2 up to section 10 the temperature was 210° C. on average, whilst in the last two sections 11 and 12 it was maintained on average a temperature of 200° C.

The test was performed by supplying isotactic polypropylene (MFR=0.8 g/10 min) to section 1; in the two successive sections, 2 and 3, the homogenisation of the polymer took place; the reaction initiator (2,5 dimethyl 2,5 diterbutyl peroxy-hexane) and the grafting system, composed by maleic anhydride (MAH) and butylic ester of 3-(2-furfuril) acrylic acid (BFA), was supplied to Section 4.

For the final product the final MFR (evaluated according to the ASTM 1238 method) and the degree of grafting FD (MAH) relative to the starting anhydride groups were noted.

Reagent Mixture Composition:
100 parts by weight of polypropylene;
0.2 parts by weight of BFA;
2 parts by weight of MAH;
0.08 parts by weight 2,5 dimethyl 2,5 diterbutyl peroxy-hexane;
Final MFR=1.7 (g/10 min);
FD (MAH)=0.60% mol.

EXAMPLE 17

Comparison

The procedure was as in example 16, but no other compound was mixed to the polypropylene. The final product has a MFR (melt flow rate)=1.0 g/10 min.

By comparing the examples 16 and 17, it can be seen how the value of MFR of the two products are comparable, confirming the significant effect of containment of the degradatory reactions by the grafting system according to the invention.

The invention claimed is:

1. A controlled radical grafting process of a polyolefin, derived from monomeric units comprising α-olefins, comprising the reaction of the polyolefin and at least one radical reaction initiator with a grafting system which comprises at least one grafting compound having an electron donator heterocyclic aromatic ring conjugated to at least one —HC=CR$_1$R$_2$ group in which at least one of R$_1$ and R$_2$ is an electron acceptor functional group, wherein said grafting system further includes at least one unsaturated compound which has at least one group which reacts with an aminic and/or carboxylic and/or hydroxylic functionality and is chosen from acrylic and methacrylic compounds, maleic anhydride, derivatives ester of maleic anhydride, and their mixtures.

2. A process according to claim 1, in which R$_1$ and R$_2$ are chosen independently of one another from —H, —COOR, —COOH, —COR, —COH, —CN, —CONH$_2$, —COO(CH$_2$)$_n$CF$_3$ and —COO(CH$_2$)$_n$CN, where R is a linear or branched aliphatic or aromatic linear alkyl group and n is a whole number lying between 1 and 20, with the proviso that R$_1$ and R$_2$ are not both —H.

3. A process according to claim 1, in which the said heterocyclic ring is a substituted furanic thiofenic, or pyrrolic ring.

4. A process according to claim 1, in which the said grafting system comprises a compound of formula:

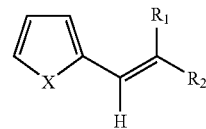

where X is chosen from O, S and N, and R$_1$ and R$_2$ are the same or different functional groups chosen from —COOR, —COOH, —COR, —COH, —CN, —CONH$_2$, —COO(CH$_2$)$_n$CF$_3$ and —COO(CH$_2$)$_n$CN where R is an aliphatic or aromatic linear or branched alkyl group and n is a whole number lying between 1 and 20.

5. A process according to claim 4, in which the said groups R$_1$ and R$_2$ are the same of the type —COOR, where R is —CH$_2$CH$_3$.

6. A process according to claim 4, in which the said group R$_1$ is —CN and the group R$_2$ is —COOR, where R is —CH$_2$CH$_3$.

7. A process according to claim 1, in which the said grafting system comprises a compound of formula:

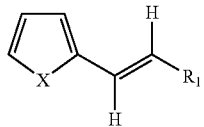

where X is chosen from O, S and N, and $R_1$ is a functional group chosen from —COOR, za-COOH, —COR, —COH, —CN, —CONH$_2$, —COO(CH$_2$)$_n$CF$_3$ and —COO(CH$_2$)$_n$CN where R is a linear or branched aliphatic or aromatic linear alkyl group and n is a whole number lying between 1 and 20.

8. A process according to claim 7, in which the said group $R_1$ is —COOR, where R is —CH$_2$CH$_2$CH$_2$CH$_3$.

9. A process according to claim 1, in which the said polyolefin is chosen from the group consisting of homopolymers and copolymers of α-olefins and their mixtures.

10. A process according to claim 1, in which the said radical initiator has a half life lying between 10 and 200 seconds in the temperature range lying between 120 and 240° C.

11. A process according to claim 1, in which the said radical initiator is an organic peroxide such as a dialkyl peroxide, a diacil peroxide, a peroxy ester or a peroxychetal.

12. A process according to claim 1 in which the said radical initiator is chosen from the group consisting of dicumil peroxide, ditertbutyl peroxypropylbenzene,2,5dimethyl2,5ditertbutyl peroxy-hexane,3,6,9-triethyl-3,6,9trimethyl-1,4,7triperoxynonan and their mixtures.

13. A process according to claim 1, in which 0.5 to 30% by weight of the said grafting system and from 0.05 to 5 parts by weight of the said radical initiator are mixed with 100 parts by weight of the said polyolefin.

14. A process according to claim 1, in which 100 parts by weight of the said polyolefin are mixed with 1-25 parts by weight of an unsaturated compound chosen from acrylic and methacrylic compounds, maleic anhydride, ester derivatives of maleic anhydride and their mixtures, 0.05-5 parts by weight of a radical initiator of organic peroxide type and 0.1-5 parts by weight of a compound of formula

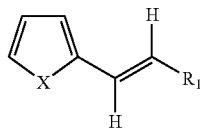

where X can be chosen from O, S and N, and $R_1$ is a functional group chosen from COOR, —COOH, —COR, —COH, —CN, —CONH$_2$, —COO(CH$_2$)$_n$CF$_3$ and —COO(CH$_2$)$_n$CN, where R is a linear or branched aliphatic or aromatic alkyl group and n is a whole number lying between 1 and 20.

15. A process according to claim 13, in which 100 parts by weight of the said polyolefin are further mixed with 0.01-1 parts by weight of a radical reaction inhibitor.

16. A process according to claim 15, in which the said radical reaction inhibitor is chosen from the group consisting of 3,5-di-tert-butyl-4hydroxytoluene, pentaerythrityl-tetrakig[3-(3,5-di-i-butl-4-hydroxlphenyl)-propionate] and actodecyl3,5-di-(tert)-butly-4hydroxhyrocinnamot.

17. A process according to claim 1, performed in a mixer provided with a rotor.

18. A process according to claim 17, in which the said grafting system is introduced into the mixer after the polyolefin.

19. A process according to claim 18, in which the said grafting system is introduced into the mixer once the torque transmitted by the rotor member is stabilized.

20. A process according to claim 17, in which the said radical initiator is introduced subsequently to the grafting system.

21. A process according to claim 17, in which the rotor member turns with an angular velocity of 20-70 rpm.

22. A process according to any of claim 17, in which the residence time of the reagents in the mixer lies between 5 and 30 minutes.

23. A process according to claim 17, in which the temperature of the reagents lies between 120 and 230° C.

24. A process according to claim 17, performed continuously by means of a twin screw extruder.

25. A process according to claim 1, in which the said heterocyclic ring is an unsubstituted furanic thiofenic, or pyrrolic ring.

* * * * *